US010075077B2

(12) United States Patent
Vilhunen (10) Patent No.: US 10,075,077 B2
(45) Date of Patent: *Sep. 11, 2018

(54) SWITCHED-MODE CONVERTER AND METHOD FOR CONVERTING ELECTRICAL ENERGY (71) Applicant: FINELC OY, Vantaa (FI)

(72) Inventor: Jukka Vilhunen, Vantaa (FI)

(73) Assignee: FINELC OY, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,306

(22) Filed: Dec. 26, 2017

(65) Prior Publication Data
US 2018/0123467 A1 May 3, 2018

Related U.S. Application Data (62) Division of application No. 15/122,350, filed as application No. PCT/FI2015/050123 on Feb. 27, 2015, now Pat. No. 9,893,637.

(30) Foreign Application Priority Data

Feb. 28, 2014 (FI) ..................................... 20145198

(51) Int. Cl.
H02M 3/158 (2006.01)
H02M 3/335 (2006.01)
(Continued)

(52) U.S. Cl.
CPC .......... *H02M 3/1584* (2013.01); *H01F 27/24* (2013.01); *H01F 27/28* (2013.01);
(Continued)

(58) Field of Classification Search
CPC .......... H02M 3/33576; H02M 1/4225; H02M 3/155; H02M 3/1584; H02M 3/33523;
(Continued)

(56) References Cited

U.S. PATENT DOCUMENTS 5,072,353 A 12/1991 Feldtkeller
5,861,734 A 1/1999 Fasullo et al.
(Continued)

FOREIGN PATENT DOCUMENTS

CN 202221696 5/2012
EP 1659678 5/2006
(Continued)

OTHER PUBLICATIONS

Finnish Search Report, dated Oct. 23, 2014, from corresponding Finnish application.
(Continued)

*Primary Examiner* — Daniel Kessie
(74) *Attorney, Agent, or Firm* — Young & Thompson (57) ABSTRACT There are large amounts of switched-mode power supplies used for supplying energy for electrical devices. This brings the need to improve the efficiency of the power conversion. The present switched mode converter of electrical power has a secondary winding in a secondary circuit, which at a first phase both accumulates and releases energy to load, or only accumulates energy. At a second phase the secondary winding is connected to input voltage and/or releases the accumulated energy in the secondary circuit in order to increase power release of the primary winding to the load. The solution increases both the output energy and efficiency of the converter.

15 Claims, 5 Drawing Sheets (51) Int. Cl.
*H02M 3/155* (2006.01)
*H01F 37/00* (2006.01)
*H01F 27/28* (2006.01)
*H02M 1/42* (2007.01)
*H01F 27/24* (2006.01)
*H02M 1/00* (2006.01)

(52) U.S. Cl.
CPC .......... *H01F 37/00* (2013.01); *H02M 1/4225* (2013.01); *H02M 3/155* (2013.01); *H02M 3/33523* (2013.01); *H02M 3/33576* (2013.01); H02M 2001/0064 (2013.01); H02M 2003/1586 (2013.01)

(58) Field of Classification Search
CPC .. H02M 2001/0064; H02M 2003/1586; H01F 27/24; H01F 27/28; H01F 37/00
See application file for complete search history.

(56) References Cited

U.S. PATENT DOCUMENTS

| | | | |
|---|---|---|---|
| 6,667,893 B2 | 12/2003 | Daun-Lindberg et al. | |
| 2010/0097828 A1* | 4/2010 | Chen | H02M 3/1584 363/72 |
| 2011/0090716 A1 | 4/2011 | Asuke et al. | |
| 2011/0133716 A1 | 6/2011 | Cheung et al. | |
| 2011/0248812 A1 | 10/2011 | Hu et al. | |
| 2011/0279100 A1 | 11/2011 | Ikriannikov | |
| 2012/0249280 A1* | 10/2012 | Nussbaum | H01F 27/2804 336/192 |
| 2012/0250363 A1* | 10/2012 | Skinner | H02M 3/1584 363/21.12 |
| 2012/0257421 A1 | 10/2012 | Brkovic | |
| 2013/0141199 A1 | 6/2013 | Hayes et al. | |
| 2013/0154590 A1 | 6/2013 | Ragona et al. | |
| 2014/0152208 A1 | 6/2014 | Jeong et al. | |

FOREIGN PATENT DOCUMENTS

| | | |
|---|---|---|
| EP | 2565883 | 3/2013 |
| JP | 2000269058 | 9/2000 |
| JP | 2008306786 | 12/2008 |
| WO | 2013042539 | 3/2013 |

OTHER PUBLICATIONS

International Search Report, dated May 28, 2015, from corresponding PCT application.
Soltanzadeh K. et al., "Investigation of DC-DC resonant converter constructed nanostructure magnetic core transformer for power distribution system", Electrical Power Distribution Networks (EPDC), 2012, pp. 1-8.

* cited by examiner

SWITCHED-MODE CONVERTER AND METHOD FOR CONVERTING ELECTRICAL ENERGY

FIELD OF INVENTION

The present invention relates generally to switched-mode converters of electric power. More specifically, the present invention relates to what is disclosed in the preambles of the independent claims. The invention has advantageous applications especially in power supplies of electrical devices.

BACKGROUND

Power supplies, such as switching power supplies, are used for providing direct current (DC) supply for various electronic devices. Such power supplies may be connected at the electrical power input of a device, or they may convert power for a specific part of a device, for example. Power supplies are nowadays usually implemented with switched-mode converters. The input of a switched-mode converter may be AC or DC current, and input/output voltages vary according to the implementation. While most electronic devices have switched-mode power supplies for providing the operating power it is essential that the switched-mode converters have a good efficiency.

Switched-mode converters use input current for charging energy to an inductor in one phase, and in another phase the charged energy is led to load. These operating phases are switched with high frequency. The basic structures of switched power supplies include boost-type converters which increase the voltage, and buck-type converters which decrease the voltage. In the boost type power supply the input power is led to the load with an inductor, wherein a transistor connects the inductor directly to the input voltage in a first phase for loading energy to the inductor, and in a second phase the charged inductor is connected to the load for supplying energy with higher voltage. In the buck-type converter a current flows continuously in the circuit of an inductor and a load A transistor sequentially connects the input voltage to the circuit thus increasing the energy of the inductor in a first phase, for being used in the load in a second phase.

Additionally there exist combinations of the basic switched-mode converter types, such as converters based on resonance, and cascade-type converters for increasing voltage. Simple switched-mode power supplies typically have efficiency between 70% and 90%. For example, nominal efficiency of a boost-type power supply is typically 70% and efficiency of a buck-type power supply is typically 80-90%. There are also power supplies with higher efficiencies, such as split-pi type switch power supplies where several transistors are used for connecting the input energy source to feed several inductors sequentially so that the current from the input voltage source is almost even. This minimizes losses caused by current changes and current spikes, and it is possible to achieve efficiencies that are higher than 90%. However, this solution leads to a more complicated structure and therefore higher production costs.

The following two documents disclose interleaved converters with two sequentially switched, parallel inductors: Taufik Taufik, Tadeus Gunawan, Dale Dolan and Makbul Anwari, Documents Design and analysis of two-phase boost DC-DC converter World Academy of Science, Engineering and Technology, issue 43, 2010, and Mounica Ganta, Pallam Reddy Nirupa, Thimmadi Akshitha, Dr. R. Seyezhai, Simple and Efficient Implementation of Two-Phase interleaved Boost Converter for Renewable Energy Source, International Journal of Emerging Technology and Advanced Engineering Volume 2, Issue 4, April 2012. The solution is based on a number of boost converters connected in parallel. This solution has advantages in applications with very small power, but technology would not be suitable for other applications.

The majority of power supplies are implemented using either of the two basic converter structures. Therefore the power losses form a large portion of electrical energy consumption. Additionally, power losses of the prior art power supplies heat the devices and cause their operating life to become shorter.

SUMMARY OF THE INVENTION

It is an object of the present invention to provide a switched power converter for various applications, wherein the described disadvantages of the prior art are avoided or reduced. The object of the invention is therefore to achieve improved efficiency of a power supply with a relatively simple structure.

The object of the invention is achieved by using a secondary winding on the ferromagnetic core of the converter, and controlling the secondary winding in two phases in order to increase the power release from the magnetic flux to the load, through both the primary and the secondary windings.

More specifically, the object of the invention is achieved by providing a switched mode converter for converting electrical power, comprising:
 a ferromagnetic core,
 a primary winding on the ferromagnetic core,
 a first controllable primary switch connecting the primary winding to input power when the switch is in ON state,
 a second primary switch connecting the primary winding to load,
wherein the first controllable primary switch is controlled with primary control pulses to energize the primary winding by increasing its current during a primary pulse to create a magnetic flux in the core, and
wherein between primary pulses the primary winding releases energy of the magnetic flux to the load whereby the current of the primary winding decreases, which is characterized in that in order to improve the efficiency of the converter the converter further comprises a secondary circuit with a secondary winding on the ferromagnetic core, and the secondary circuit is arranged to transfer energy of the secondary winding and/or another energy source to the primary winding during said decrease of current of the primary winding. According to an embodiment this in such a situation where the magnetic flux in the location of the secondary winding is smaller than the magnetic flux of in the location of the primary winding, and/or the total current of the secondary winding is less than the total current of the primary winding.

The invention also relates to a method for converting electrical power, wherein:
 a first primary switch is controlled to connect a pulse of input voltage to a primary winding of a ferromagnetic core at a first phase,
 thereafter, released energy from the primary winding is led to a load through second primary switch at a second phase, whereby the current of the primary winding is decreased,
which method is characterised in that in order to improve the efficiency of the conversion energy of the secondary winding and/or another energy source is transferred to the primary winding during said decrease of current of the primary winding.

According to the invention, a switched mode converter for converting electrical power in a first phase and a second phase, comprises in its coupling:
- a ferromagnetic core,
- a primary winding on the ferromagnetic core,
- a secondary winding on the ferromagnetic core,
- a first controllable primary switch, in said first phase, coupled to have ON state and OFF state, coupled controllable with primary control pulses having states corresponding said ON and OFF states of said primary switch, to connect the primary winding to input power when the switch is set into ON state, to energize the primary winding to increase its current to create a magnetic flux in the core, until the primary switch is set into OFF state, by the control pulse's OFF state, so that the increase of the magnetic flux also increases the secondary current in the secondary winding,
- a controllable secondary switch, coupled to have ON state and OFF state, coupled controllable with secondary control pulses having phases corresponding said ON and OFF states, coupled to connect the secondary winding to input power when the switch is set into ON state, to energize the secondary winding to the load, wherein in said second phase, said secondary winding is coupled to get energized by said secondary control pulses of input power via a secondary switch being controlled to ON state directly when the primary pulse's state corresponds the state OFF of said primary switch, when in said second phase the primary winding being releasing the magnetic energy into the ferromagnetic core, wherein to have the converter operated with an improved efficiency, said secondary winding is located at some distance from the primary winding so to provide an unequal magnetic flux to develop in the ferromagnetic core; and/or at least one of said primary and secondary windings have such a shape or diameter, that the magnetic flux of the ferromagnetic core is unequal being smaller on the location of the secondary winding because of the opposite current direction of the secondary winding which reduces the growth of the magnetic flux.

According to an embodiment of the invention the switched mode converter comprises in the coupling means to produce counter voltage as coupled to an opposite polarity in relation to the secondary current, coupled to produce a counter voltage in the secondary circuit, wherein the counter voltage means comprise at least one of the following: the inductance of the secondary circuit and a capacitor, and an accumulator.

According to an embodiment of the invention the switched mode converter comprises in the coupling a secondary switch to controllably set the secondary winding into the state of being not energized by pulses of input power, wherein the secondary side of the coupling comprises an inductance having a self-inductance, which generates a voltage proportional to the secondary current change, said inductance being a further inductance or the inductance of in an embodiment in accordance of the invention.

According to an embodiment of the invention in the switched mode converter the coupling at the secondary winding side comprises an additional voltage source, that is at least one of the following: Inductor, capacitor, accumulator.

According to an embodiment of the invention in the switched mode converter the inductance of the secondary circuit is greater than the inductance of the primary circuit.

According to an embodiment of the invention in the switched mode converter the secondary winding is coupled continuously to the load with a switching component, and accordingly also in such a way coupled that during the decrease phase of the primary and secondary currents these currents release energy to the load, the coupling being implemented without the secondary switch.

According to an embodiment of the invention in the switched mode converter that the distance between the inner diameter of the secondary winding and the outer diameter of the core is higher than the distance between the inner diameter of the primary winding and the outer diameter of the core.

According to an embodiment of the invention in the switched mode converter according to an embodiment comprises an inductor in series with the secondary winding, said inductor being separate from said core.

According to an embodiment of the invention the switched mode converter according to an embodiment has such a ferromagnetic core that has a closed shape. According to an embodiment the ferromagnetic core has a shape of a toroid, a polygon, or a pot-core.

According to an embodiment of the invention in the switched mode converter the primary winding and the secondary winding have separated positions on the core, preferably located at opposite sides of the core.

According to an embodiment of the invention in the switched mode converter the primary and secondary windings are arranged on to the magnetic core so that the magnetic flux of the ferromagnetic core is unequal along the path of the magnetic core being smaller on the location of the secondary winding.

According to an embodiment of the invention in the switched mode converter the windings of said primary and secondary windings are so made that opposite current direction of the secondary winding occurs to reduce the growth of the magnetic flux.

According to an embodiment of the invention in the switched mode converter the windings of said primary winding and secondary winding are so made that a smaller magnetic flux at the location of the secondary winding induces a smaller counter voltage in the secondary winding during the second phase consequently consuming less input power by the secondary winding in the second phase during the reduction of the primary and secondary currents.

According to an embodiment of the invention in the switched mode converter according to an embodiment, the converter further comprises a secondary circuit with a secondary winding on the ferromagnetic core, and the secondary circuit is arranged to transfer energy of the secondary winding and/or another energy source to the primary winding during said decrease of current of the primary winding.

A method according to an embodiment of the invention for converting electrical power, comprising:
  at a first phase controlling a first primary switch being controlled to connect a pulse of input voltage to a primary winding of a ferromagnetic core,
  at a second phase releasing energy thereafter, from the primary winding being led to a load through second primary switch, whereby the current of the primary winding is decreased,
characterised by
  transferring energy to the primary winding during said decrease of current of the primary winding and/or another energy source in order to improve the efficiency of the conversion energy of the secondary winding.

According to an embodiment of the invention the method for converting electrical power comprises:

during the second phase, controlling a first secondary switch to connect a pulse of input voltage to a secondary winding of the ferromagnetic core in order to increase the release of energy from the primary winding to the load, and leading during the first phase released energy from the secondary winding of the core to the load through second secondary switch.

According to an embodiment of the invention the method of converting electrical power, with a switched mode converter according to an embodiment of the invention as being coupled for converting electrical power via utilization of an unequal magnetic flux in the core, the coupling having at least one of said primary and secondary windings, being located, and/or has such a shape or diameter, at some distance from the secondary and primary winding, respectively, to provide an unequal magnetic flux, the method comprises controlling in the first phase, the first controllable switch with primary control pulses to energize the primary winding to increase its current to create a magnetic flux in the core, switching by said primary control pulses the first controllable primary switch into ON state to connect the primary winding to input power during said control pulse, energizing in the second phase directly after the primary pulse the secondary winding by secondary pulses of input power via the second switch in ON state during said secondary pulses, directing by setting said first controllable primary switch into OFF state, the primary winding to release magnetic energy of the magnetic flux to the load between the ON states of the primary pulses, whereby the current of the primary winding decreases.

According to one embodiment of the invention inductance of the secondary circuit is greater than inductance of the primary circuit. There are two main embodiments to increase the inductance of the secondary circuit. In one embodiment the distance between the inner diameter of the secondary winding and the outer diameter of the core is higher than the distance between the inner diameter of the primary winding and the outer diameter of the core. The inductance of the secondary winding is thus increased by increasing the inner diameter of the winding. In another embodiment there is an inductor in series with the secondary winding, said inductor being separate from said core. If a separate inductor is used there is no need to use a greater inner diameter of the secondary winding. However, it is also possible to use a combination of these two embodiments and have both a larger diameter of the secondary winding as well as a separate series inductor at the secondary circuit.

According to one further embodiment of the invention ferromagnetic core has a closed shape, such as a toroid, or a polygon. The primary and secondary windings are preferably positioned in separate locations on the core. This is advantageous in order to achieve unequal value of magnetic flux in the core at the locations of the windings. The primary and secondary windings are preferably located at opposite sides of the core in order to achieve a large difference between the values of magnetic flux at the locations of the windings.

Some preferable embodiments of the present invention are described in dependent claims.

The present invention has substantial advantages over prior art solutions. The efficiency of the power converter is increased with an essential amount, which saves the use of energy. This has benefits for individual users as well as in the global scale.

The switched mode converter according to the present invention can be implemented with a small number of power components and control components, whereby the circuit can be economically produced.

In this patent application "a pulse" is used to mean preferably a substantially rectangular shaped pulse, but it may alternatively mean a pulse of other shape, such as sine-shaped.

BRIEF DESCRIPTION OF THE DRAWINGS

The described and other advantages of the invention will become apparent from the following detailed description and by referring to the enclosed drawings where.

DETAILED DESCRIPTION OF SOME EMBODIMENTS

Figure 1:
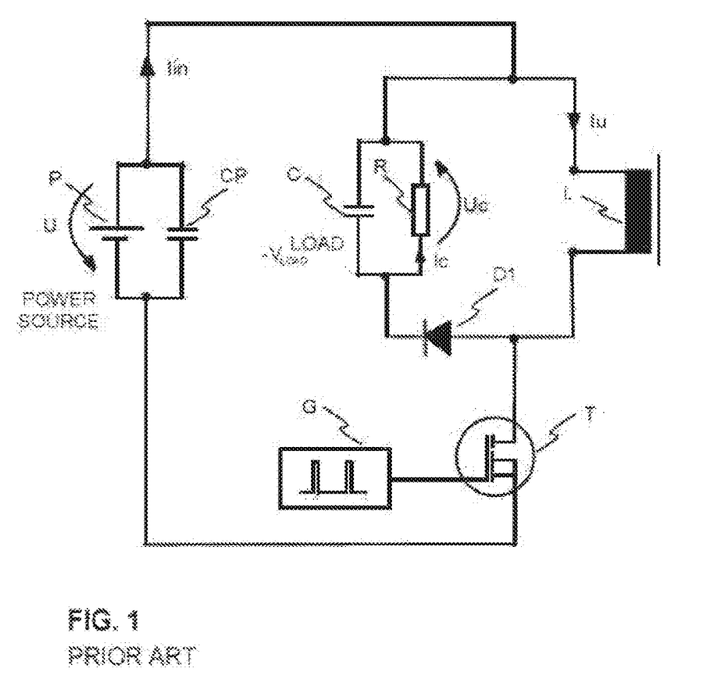
FIG. 1 illustrates a circuit diagram of a typical buck-boost-type switched-mode power supply according to prior art.

In order to understand the new features of the invention the functionality of a prior art switched-mode power supply is first described in reference to FIG. 1, and next functionality of exemplary embodiments of the present invention is described in reference to FIGS. 2-6B.

FIG. 1 illustrates an exemplary circuit according to prior art for providing a basic switched mode power supply of buck-boost-type. The circuit has an inductor winding L which is wound around a ferromagnetic core. Capacitor CP is charged with the input voltage U of an input power source P. The capacitor CP is coupled to the inductor L with a switching transistor T. The transistor is controlled to ON state with short pulses of e.g. 10 μs length provided from a pulse generator G. The transistor thus connects short current pulses from the capacitor CP to the inductor L. During the OFF state of the transistor T the energy of the inductor L is led through the diode switch D1 to the load capacitor C and load R. The diode switches prevent the energy charged to the capacitor C from discharging to the inductor or input power source.

Efficiency of the circuit is calculated by dividing the energy applied to the load R with the energy supplied by the input power source P during a certain time period. The efficiency of this basic circuit is around 80% for a core of average length of about 200 mm. A circuit of FIG. 1 was tested by the applicant with following data:

U=30 V
Iu=0.038 . . . 0.040 A
Pin=U*Iin=1.17+/−0.03 W
Uc=30.11 V
Ic=0.030 A
Pout=Uc*Ic=0.903 W
η=Pout/Pin=77.2%

The terms have following meanings:
U=input voltage
Iu=primary current
Pin=power supplied from the power source to the converter
Uc=Voltage supplied by primary winding
Ic=Load current
Pout=power to load
η=efficiency of the converter The measurement thus shows that the efficiency of this prior art circuit was 77.2%.

Figure 2A:
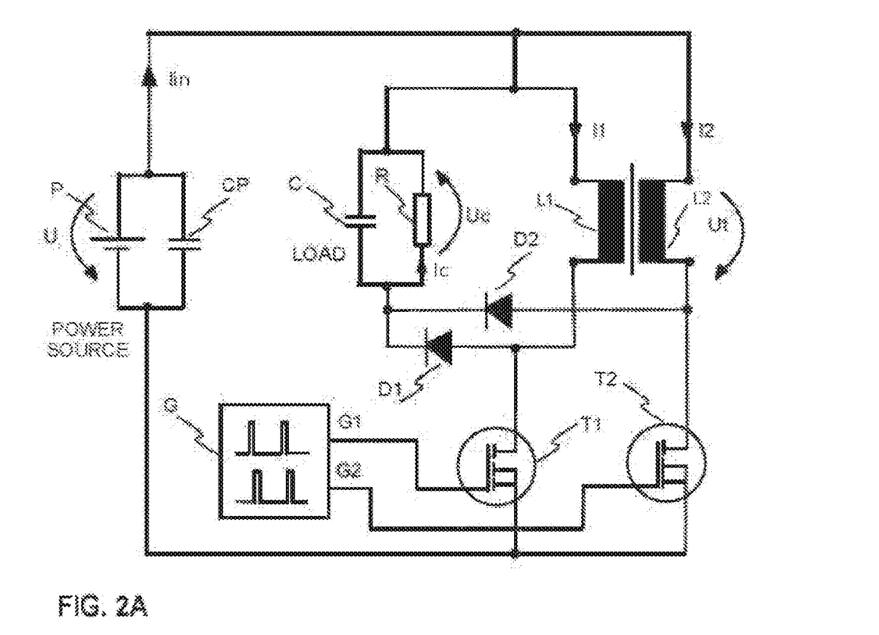
FIG. 2A illustrates a circuit diagram of an exemplary switched mode power converter in accordance with the present invention where inductance of the secondary circuit is increased by using an enlarged inner diameter of the secondary winding.

FIG. 2A illustrates an exemplary switched mode converter circuit according to the invention. The primary circuit of the converter is similar to the prior art circuit. The primary circuit has an inductor winding L which is wound around a ferromagnetic core. Capacitor CP is charged with the input voltage U of an input power source P. The capacitor CP is coupled to the inductor L1 with a switching transistor T1. The transistor is controlled to ON state with short pulses G1 of e.g. 10 μs length provided from a pulse generator G. The transistor thus connects short current pulses from the capacitor CP to the inductor L. During the OFF state of the transistor T the energy of the inductor L is led through the diode switch D1 to the load capacitor C and load R. The diode switch prevents the energy charged to the capacitor C from discharging to the inductor or input power source.

The ferromagnetic core has a secondary inductor winding L2. The secondary winding is not closely wound around the core, but the winding has a larger inner diameter than the outer diameter of the core, thus leaving a non-ferromagnetic space between the core and the secondary winding. The secondary winding is connected to the load with diode D2, which allows the electrical energy to flow from the secondary winding to the load but not vice versa. The circuit has another switching transistor T2 for also switching one end of the secondary winding L2 to the input power source. The second end of the secondary winding is connected to the input power source. The primary and secondary circuits are thus symmetric.

The switching transistors T1 and T2 are controlled with successive pulses, which first switch the transistor T1 to ON state for a short time period in first phase. After the primary transistor T1 has been switched back to OFF state the second transistor T2 is switched to ON state for a short time period, such as 10 . . . 13 μs in second phase. In the first phase the secondary winding releases electrical energy to the load through diode switch D2. In the second phase the secondary winding is connected to the input voltage, increasing the release of energy from the first winding to the load.

Figure 4:
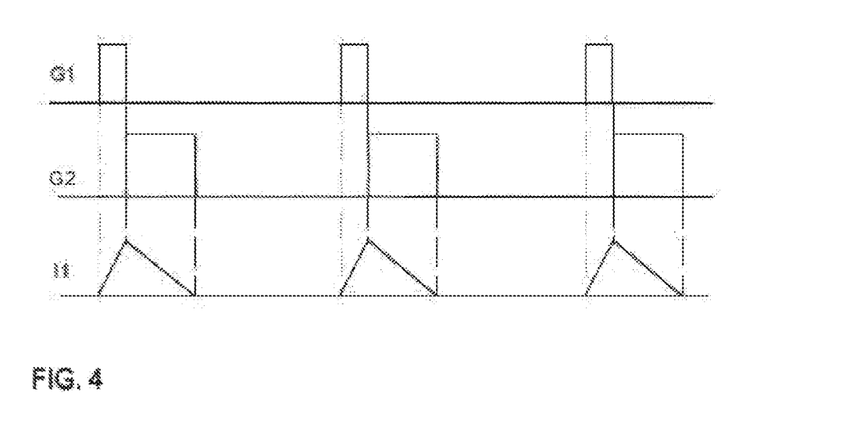
FIG. 4 illustrates a diagram of an exemplary control sequence for circuits of FIGS. 2 and 3.

FIG. 4 illustrates an exemplary control sequence. G1 is the control pulse of the primary switch and G2 is the control signal of the secondary switch. I1 is the current of the primary winding. At the first phase, when the primary switch is switched ON by the G1 control signal the current of the primary winding increases in accordance to the input voltage and the inductance of the primary winding. During the first phase energy flows partly to the load through the secondary winding L2.

At the second phase the primary switch is controlled OFF by signal G1, and the secondary switch is controlled ON by signal G2 for a short period. The secondary winding is thus connected to the input voltage. The current of the primary winding is reduced, but with a slower pace due to the effect of the voltage in the secondary winding. While the current of the primary winding is reduced more slowly, energy flows to the load from the primary winding for a longer time, and larger amount of energy flows to the load. This way, increased output power is achieved as well as increased efficiency. The pulses G1 and G2, as well as first and second phases, are then repeated with an interval.

Also shown by measurements, the inventive use of secondary circuit increases both power output of the converter as well as efficiency. In measurements of an exemplary circuit following values have been present:

U=Ut=30 V
Ne=25
Nt=38
Iin=0.105 A
Pin=Ue*Iin=3.15 W
Uc=28.03 . . . 28.22 V
Ic=0.104 A
Pout=Uc*Iin=2.925 W+/−0.01 W
η=Pout/Pin=92.8%

The terms have following meanings:
U=input voltage
Ut=voltage of the secondary winding
Ne and Nt are the number of turns in the primary and secondary windings respectively
Iin=current supplied from the power source to the converter
Pin=power supplied from the power source to the converter
Uc=Voltage supplied by primary winding
Ic=Load current
Pout=power to load
η=efficiency of the converter As shown by the measurement, the efficiency was 92.8%, which is essentially higher compared to the prior art circuit of FIG. 1.

The principle of function is next described by examining the above example in more detail. In this example the ferromagnetic core is made of two U-shaped halves which are attached into a closed magnetic circuit. The diameter of the core is 17 mm, and the average length of the core is 200 mm. The core has a primary winding L1 which has Ne=25 turns. A secondary winding is located on the core, opposite to the primary winding. The secondary winding has Nt=38 turns, and the diameter d2 of the secondary winding is 100 mm, and the cylindrical length of the winding can be e.g. 25 mm . . . 35 mm. With the length of 25 mm the winding has an inductance of L2=200 pH, and with the length of 35 mm its inductance is L2=170 μH. In the previous example a coil of 170 μH was used, whereas in the following example a coil of 200 μH is used. The value of dI/dt in the phase 1 is a little lower, but they both give the same improvement in the efficiency.

In the first phase a pulse of 10 μs is fed to the primary winding, which causes the secondary winding to feed current to the load. In the second phase the current of the primary winding is fed to the load, while at the same time the secondary winding is connected to the input voltage U. If the switches, magnetic core and windings would operate without losses and U=Uc, then the first and the second phases would be equally long, and energy taken from the voltage input by the primary winding in the first phase would be the same as fed to the load during the second phase. Also the secondary winding feeds during the first phase current to the load as much as it takes during the second phase. In practice, the components have losses, and the second phase is then shorter than the first. However, as in an ideal transformer the products Ne*Ie and Nt*It are almost the same, it can be measured in the above arrangement that there is a great difference in these products: Ne*Ie is remarkably bigger than Nt*It. The measurements show that typically Ne*Ie=25*0.9 A=22.5 A and Nt*It=38*0.45 A=17.1 A, and then the relation of Ne*Ie/Nt*It=1.32, or Ne*Ie=1.32 Nt*It.

The high current difference of the primary and secondary winding effects in the following way: If the voltages U and Uc are equal, the secondary winding feeds less current in the load during the phase 1, but it also takes equally less power in the phase 2, and no increase in the efficiency is seen. Now, if the phase 2 is made longer in one way or the other, then the secondary winding would maintain the higher primary current for a longer period when it decreases towards zero. In this case the secondary current takes power according to the formula Pt=U*It, but the primary current feeds power to the load according to Pe=Uc*Ie. Here Nt*It is now less than Ne*Ie by the multiplier 1.32. Because the winding turns are 25 in the primary and 38 in the secondary windings and their relation is 0.658, the voltage applied to the secondary winding in the phase two effects by this relation to the primary winding, but however, the secondary current is not this much smaller, but instead 0.658/1.32 times smaller, i.e. instead 0.6 A it is 0.45 A because of the current difference. Accordingly it takes less power in the phase 2, which then improves the efficiency if the phase 2 is longer than the phase 1. There is also, however, a counter effect that starts to eliminate the efficiency improvement in longer periods of the phase 2. As soon as the T2 switches voltage to the secondary winding, the voltage in the secondary winding begins to reduce the current difference, and the longer the phase 2 is, the bigger the counter effect is in the phase 2.

In addition to the above example where Uc was smaller than U, and the phase 2 then longer than the phase 1, an improvement in the efficiency can be achieved also when Uc is equal to or higher than U. In the latter case the phase 2 becomes shorter than the phase 1, but also in this case the total current Nt*It in the secondary winding is smaller compared to Ne*Ie by the earlier mentioned multiplier, which means less energy from the capacitor voltage U by the secondary current during a short period of time, and accordingly improved efficiency. The same effect can be achieved also by other arrangements. E.g. if the secondary current circuit contains a sufficient inductance itself, then the energy of this inductance provides a similar forward voltage for the secondary winding as the capacitor voltage U, and the secondary current can be directed to the load capacitor also in the second phase with an improved efficiency. This example is explained more in detail elsewhere in this application.

To illustrate the above effect, a practical example calculation is shown. The voltage Uc is reduced from 30 V to 29 V (which is the sum of capacitor voltage 28.5 V and switch drop voltage 0.5 V) in order to make the phase 2 longer, which represents a 3.3% decrease in the voltage Uc. This reduction increases a little the primary and secondary currents, but most of all, it increases the time of the phase 2 from the ideal 10 μs up to 12.5 μs depending on other settings, which means 25% increase in the power output in the second phase.

When the relation of the number of turns of primary and secondary windings is 25/38=0.658, the following calculation formula can be derived for the time of the second phase: dT2=0.658*L2*dIe/(Uc−0.658*U)=0.658*200*0.9/(28.5+ 0.5−0.658*30)=12.8 μs. Considering that the main factors in the formula are the ratio of the primary and secondary winding turns and the secondary winding inductance, and the relatively good conformance with the measured result, this calculation result supports then also the reliability of the explanation of the effect. It has to be noticed that many loss factors of the arrangement have not been included in the formula, and this is why the result of calculation can be bigger than the measured value.

Figure 2B:
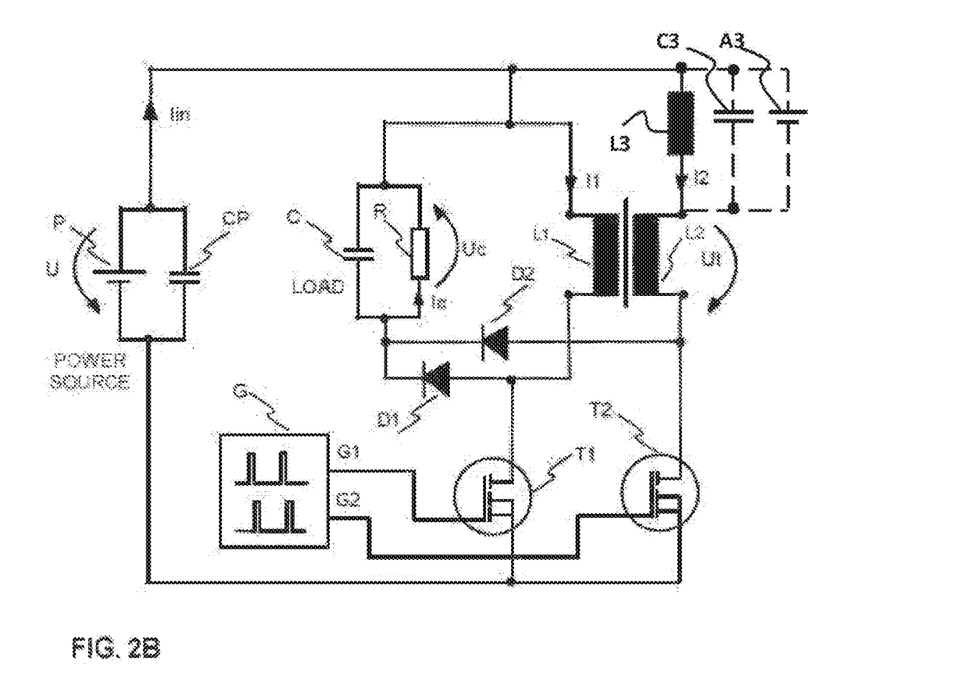
FIG. 2B illustrates a circuit diagram of an exemplary switched mode power converter in accordance with the present invention where inductance of the secondary circuit is increased by using a separate series inductor.

FIG. 2B illustrates another exemplary switched mode converter circuit according to the invention. This embodiment is similar to the embodiment of FIG. 2A, except the inductive components of the secondary circuit. In this embodiment the inductance of the secondary circuit is increased with a separate inductor L3, which is connected in series with the secondary winding L2. In this embodiment the secondary winding L2 may have a same inductance and same inner diameter as the primary winding L1 because the inductance of the secondary circuit is increased with the separate inductor L3. The inductance of the secondary circuit is the sum of the inductances of the secondary winding L2 and the separate inductor L3, whereby this sum inductance of the secondary circuit must be greater than the inductance of the primary circuit. The efficiency of this embodiment can be determined in a similar manner as for the embodiment of FIG. 2A, but instead of using the inductance value of the secondary winding it is necessary to use the sum value of the inductances of the secondary winding and the separate inductor.

There are two thus main ways to increase the inductance of the secondary circuit; increasing the diameter of the secondary winding as applied in the embodiment of FIG. 2A and using a separate series inductor as applied in the embodiment of FIG. 2B. However, it is also possible to use a combination of these two ways to increase the inductance of the secondary circuit, i.e. using both a secondary winding L2 with an increased diameter and a separate series inductor.

According to an embodiment of the invention, an additional voltage source is located at the inductance L3 location in the component topology. According to an ensemble of embodiments the voltage source can comprise at least one of the group comprising: Inductor L3, capacitor C3, accumulator A3. The dashed lines illustrate optionality between the combinations in the embodiments. According to a further embodiment the additional voltage source indicated in the FIG. 2B can be embodied similarly also in FIG. 2C as indicated in FIG. 2B and the accompanying text. Based on the illustrated embodiments, although an embodiment example with parallel coupled multi-component comprising group is shown, a skilled person in the art can provide other topologies of these components (L3, C3, A3) comprising in series coupled components. In addition resistive components can be used additionally to fit the reactance to the coupling for the indicated location.

Figure 2C:
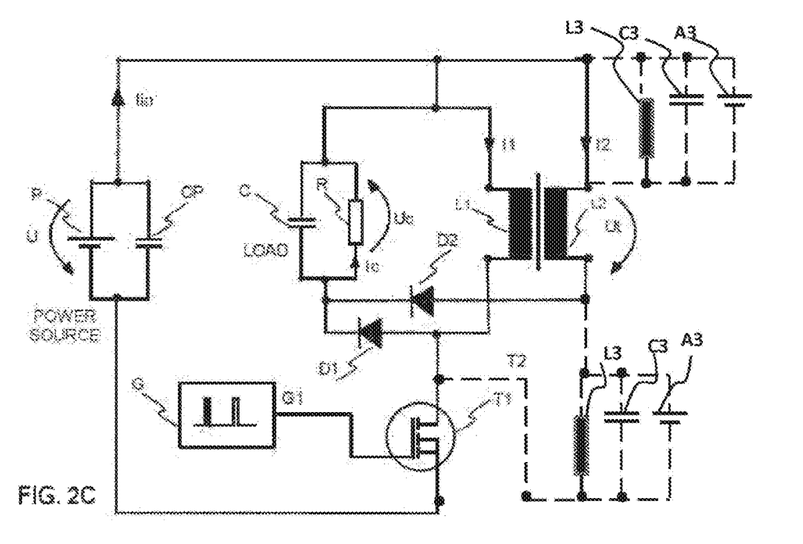
FIG. 2C illustrates a circuit diagram of an exemplary switched mode power converter in accordance with the present invention where secondary circuit does not have an actively controlled switch for connecting the secondary circuit to the power source.

FIG. 2C illustrates a circuit diagram of a further exemplary switched mode power converter. This embodiment is similar to the embodiment of FIG. 2A, except that the secondary winding is not connected to the power source with a controllable switch. Instead, the secondary winding is only connected to the load through the diode D2. An increase in efficiency is not quite as high as in the embodiment of FIG. 2A, but this circuit has fewer components and may be useful in some power supply applications. According to an embodiment of the invention an additional voltage source comprising at least one of the group comprising an inductance L3, capacitor C3 and an accumulator A3 can be added into the embodied circuit as an alternative to the secondary switch T2 or supplementary. Potential locations for such additional voltage sources are illustrated via the exemplified alternatives for single additional voltage sources, or combinations thereof. Alternative character of a couplings in FIG. 2C is indicated by a dashed line. Although same symbols used for alternative components in different locations, the example does not limit the component values only to the same value.

Figure 3:
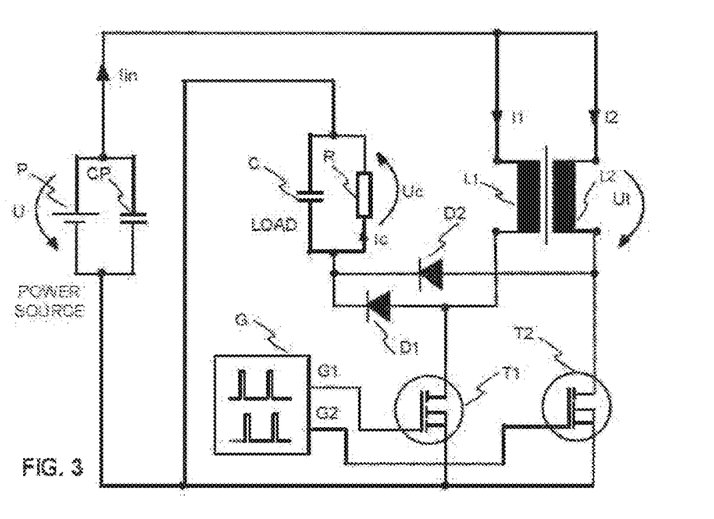
FIG. 3 illustrates a circuit diagram of an exemplary switched mode power converter in accordance with the present invention where load is coupled to same fixed potential as controllable switches.

FIG. 3 illustrates a circuit diagram of a further exemplary switched mode power converter in accordance with the present invention. In this embodiment one of the two terminals of the load is coupled to the same fixed polarity as the controllable switches T1 and T2. In the embodiments of FIGS. 2A and 2B the load terminal is coupled to the same fixed potential as the windings L1 and L2. In the embodiment of FIG. 3 the input voltage U is added to the voltages of the windings L1 and L2 when energy is transferred to the load. Therefore, energy is also transferred to the load from the input source during the both phases 1 and 2 of the converter:

In phase 1 the load voltage −Uc=−57 V and the input voltage U=30 V both affect in the secondary winding. The difference of these voltages is 27 V, and now the effective counter voltage in this example is −27 V, which is about the same as in the previous example, i.e. −Uc=−29 V. In phase 1 the primary winding is connected to the input voltage U=30 V, which causes a voltage in the secondary winding, and makes the currents rise in the secondary winding according to the secondary voltage, −Uc and inductances in the secondary winding, and in the primary winding in a similar way as in the previous examples;

In phase 2 both input voltage U and the load voltage −Uc affect in the primary winding. The counter voltage is −27 V in this example, whereby considering the reduced forward voltages from the secondary circuit to the primary circuit the counter voltage is lower by 2 V compared to the earlier example where it was 29 V. In this situation the given equation gives a longer time period for phase 2 of the converter;

The calculatory time length for phase 2 can be derived by using the given formula $dt=(Ne/Nt)*L2*dIe/(Uc-(Ne/Nt)*U)$. In the present embodiment other values in the formula are the same as in the embodiment of FIG. 2A except voltage Uc, which now has the value $Uc=U-56.5$ V$-0.5$ V$=27$ V. The formula now gives $dt=16.3$ μs, which matches with measurements.

In an embodiment of the invention the smaller magnetic flux at the location of the secondary winding induces a smaller counter voltage in the secondary winding during the second phase, which requires then less input power by the secondary winding in the second phase during the reduction of the primary and secondary currents.

The output power of the converter is thus increased when compared to the embodiment of FIG. 2A, and the efficiency is also increased by 3-4 percentage units.

FIG. 4 illustrates a diagram of an exemplary control sequence for circuits of FIGS. 2 and 3. Although the examples on rise and discharge of current I1, in respect to the pulses G1 and G2 having the state ON as indicated, illustrated in the embodiments in FIG. 4, as well as the intermediate time between two successive rises of same phase, the embodiments are not limited only to the shown example. In practice the component values in combination to the pulse generator's G pulses determine the duration of the rise and discharge, as well as the intermediate time between the triangular pulses of I1 embodied in FIG. 4, i.e. details of the pulse geometry of I1.

Figure 5:
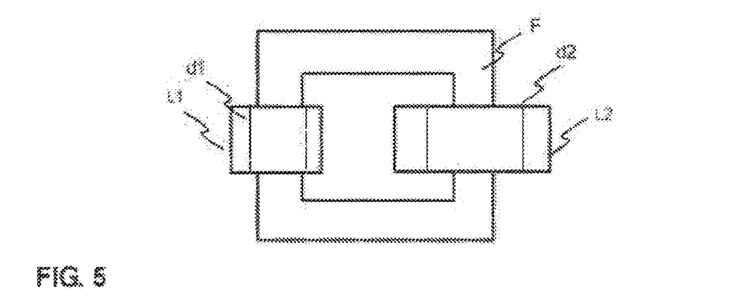
FIG. 5 illustrates an exemplary ferromagnetic core with primary and secondary windings according to the invention, where the inner diameter of the secondary winding is greater then the inner diameter of the secondary winding.

FIG. 5 illustrates an exemplary ferromagnetic core F according to the invention, which has a primary winding L1 and a secondary winding L2. The inner diameter d2 of the secondary winding L2 is greater than the inner diameter d1 of the primary winding.

In this patent specification the structure of the other various components of a switched-mode power converter is not described in more detail as they can be implemented using the description above and the general knowledge of a person skilled in the art. Each of the elements such as the switching transistors, the core, the windings, and the separate inductor, can include one component or it may consist of two or several components. The component types have been mentioned as examples, and a person skilled can think of several alternative component types providing the functionalities described above.

The switching element T1 and T2 of the converter circuit may be a power semiconductor, such as MOSFET or an IGBT, for example. The gates of the switching transistors are controlled with corresponding outputs of a pulse generator G.

Figure 6A:
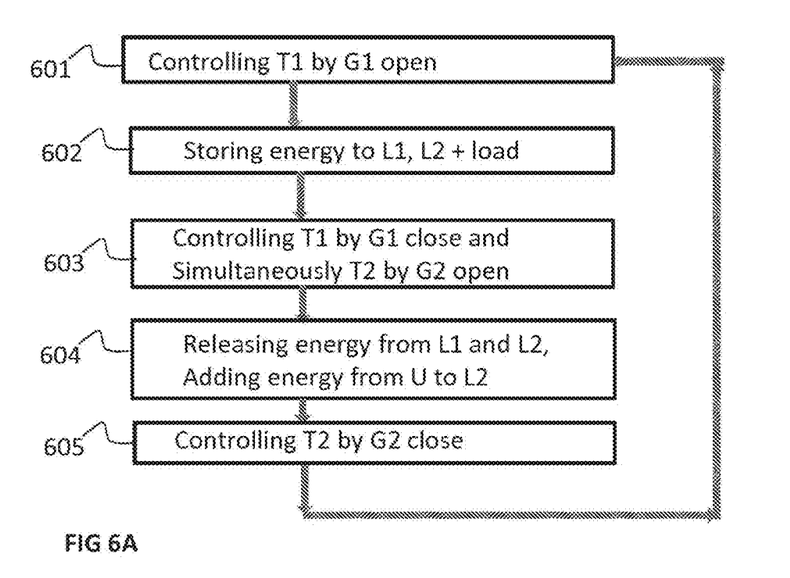
FIGS. 6A-6B. illustrate exemplary embodiments of the invention of a method to convert electricity.

FIG. 6A illustrates a method for converting electrical power, wherein an electrical power converter of switching type is used for the method implementation. In an embodiment of the method, T1 is controlled 601 to open by the corresponding level of the pulses of G1. Energy is stored 602 to L1, L2 and load. T1 is controlled 603 to close by the corresponding G1 phase, and simultaneously T2 by G2 to open in those embodiments that use T2. Energy is released 604 from L1 and L2, energy is added from U to L2. Next, T2 is controlled 605 to close by G2 in those embodiments that use T2. The cycle starts again from the 601, as illustrated by the arrows. At a first phase of the method a first primary switch T1 of the converting circuit is controlled by pulses of a pulse generator so that the first primary switch T1 connects according to the pulses of G1 of input voltage U to a primary winding L1 of a ferromagnetic core F. The pulse generator G is configured and/or coupled to produce pulses that correspond the ON state of the T1, and between two immediate such pulses there is a pulse level, called here as pitch, corresponding the OFF state of the T1. Energy is stored to L1, L2 and load.

T1 is controlled by G1 close and T2 simultaneously open by G2. According to an embodiment, in a second phase energy is released thereafter, from the primary winding L1, the energy being led to a load through second switch T2, whereby the current I1 of the primary winding L1 is decreased. According to an embodiment of the invention this energy is transferred to the primary winding L1 during said decrease of current I1 of the primary winding L1 to the primary winding and/or another energy source in order to improve the efficiency of the conversion energy of the secondary winding L2.

According to an embodiment in alternative or supplementary, during the second phase controlling the secondary switch T2 is to connect according to the pulse of G2 the input voltage U to a secondary winding L2 of the ferromagnetic core F in order to increase the release of energy from the primary winding L1 to the load LOAD, C, R, so as leading during the first phase released energy from the secondary winding L2 of the core F to the load through second secondary switch T2. T2 is controlled to close, before the T1 being controlled to open 601 in next cycle. In those embodiments that use other energy directing component than T2, the circuit operation follows the embodiments illustrated in FIG. 2C, and the energy is directed to the load according to the embodied circuit topology.

According to an embodiment variant, the pitch is set to a constant duration, but according to an embodiment variant it is made adjustable. According to an embodiment of the invention the ON state duration is set to a constant duration, but according to an embodiment variant of the invention it is made adjustable. According to an embodiment of the invention duration of a pulse and/or a pitch is determined by the pulse generator's pulse geometry, but in a variant of such an embodiment by an intermediate latch-circuit adjusted for pulse geometry and its details in respect of amplitude, pitch and/or pulse length.

According to an embodiment of the invention the pulse generator can be adjusted to change from a first pulse duration to another pulse duration. According to an embodiment of the invention the pulse generator can be used in adjusting to change from a first pitch duration to a second pitch duration.

According to an embodiment of the invention the pulses of G2 can be same way adjusted as disclosed above for the G1. According to an embodiment the G1 is made adjustable independently on G2. In alternative or supplementary, according to an embodiment the G2 is made adjustable independently on G1. According to an embodiment of the invention at least on pitch or pulse duration of at least one of G1 and G2 adjustment is step-wise, but according to an embodiment of the invention the adjustment is gliding. This way the pulse characteristics of G1 can be changed from a first set of pulsing parameters to a second set of pulsing parameters, so facilitating use of the converter for a different type of loads.

According to the step-wise change the switching between different type of loads can be made instantly as fast as the response times of the electronics allow.

Although in embodiments of the invention the pulses of G1 and/or G2 as such are considered to be generated as square pulses as illustrated in the example of FIG. 4, i.e. pulses with sharp rise and fall time with essentially constant value level there between, so as considered in terms of analogue square pulse geometry, according to an embodiment of the invention the pulse generator G or an interfacing latch circuit driving the T1 and/or T2 in G's conduction (the latch may be included into G in embodiment variant) can be adjusted digitally to generate pulses G1 and/or G2. In some embodiment variants at least one of the T1 and T2 can be driven directly by a digital signal or two forming suitable pulse trains for the respective G1 and G2 to be combined as illustrated in FIG. 4. This ways the load can be energized in accordance of the digital control signal.

Figure 6B:
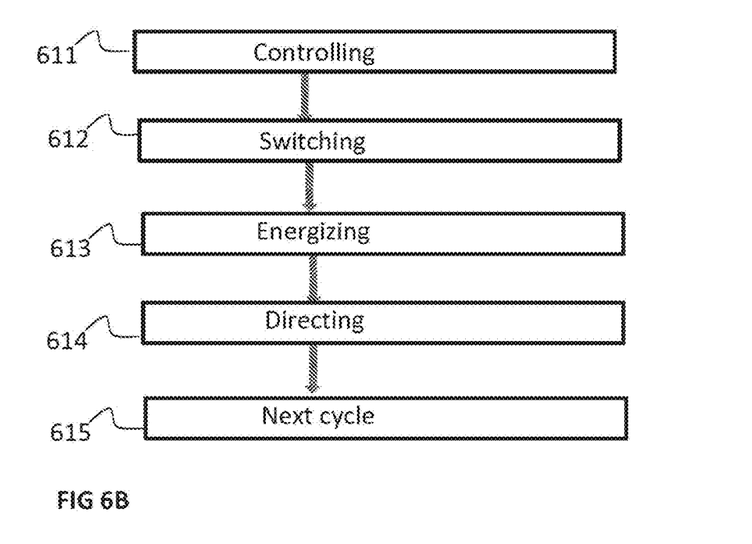

FIG. 6B illustrates a variant of an embodiment embodied as a method of converting electrical power, with a switched mode converter according to an embodiment of the invention. Such a converter is coupled for converting electrical power via utilization of an unequal magnetic flux in the core F, the coupling having at least one of said primary and secondary windings L1, L2 being located, and/or has such a shape or a diameter d1, d2, at some distance from the secondary and primary winding L2, L1, respectively, to provide an unequal magnetic flux.

According to an embodiment of the invention the method comprises: controlling 611 in the first phase, the first controllable switch T1 with primary control pulses G1 to energize the primary winding L1 to increase its current I1 to create a magnetic flux in the core F. The method comprises switching 612 by said primary control pulses G1 the first controllable primary switch G1 into ON state to connect the primary winding L1 to input power during said control pulse G1. The method comprises also energizing 613 in the second phase directly after the primary pulses G1 each the secondary winding L2 by secondary pulses G2 of input power P via the second primary switch T2 in ON state during said secondary pulses G2. In the embodiment of the method, it comprises also directing 614 by setting said first controllable primary switch T1 into OFF state, the primary winding L1 to release magnetic energy of the magnetic flux to the load LOAD, R, C, between the ON states of the primary pulses G1, whereby the current I1 of the primary winding L1 decreases. The period of G2 in ON state of T2 can be embodied according to the embodiments illustrated as associated to FIG. 4. The next cycle is scheduled 615 to begin when T1 is controlled to open as in phase 611.

The control functions of the switched-mode converter can be implemented with analogue circuits, such as an ASIC circuit, whereby a simple implementation would be achieved. However, to achieve a more advanced functionality, a digital implementation is preferred. When a microcontroller/processor is used the circuit requires a suitable processor program, which is executed in a device. To convert a known device or system into equipment according to the invention it is necessary, in addition to the hardware modifications, to store into the memory means a set of machine-readable instructions that instruct the microprocessor(s) to perform the functions described above. Composing and storing into memory of such instructions involves known technology which, when combined with the teachings of this patent application, is within the capabilities of a person skilled in the art.

Above, only some embodiments of the solution according to the invention have been described. The principle according to the invention can naturally be modified within the frame of the scope defined by the claims, for example, by modification of the details of the implementation and ranges of use.

The present invention can be applied in external and internal DC power supplies for various purposes and for various electronic devices.

The invention claimed is:

1. A switched mode converter for converting electrical power, comprising:
   coupling to a power source providing an input voltage and a corresponding input power, the coupling to the power source having a first pole and a second pole;
   a ferromagnetic core with a primary winding having a first end and an opposite second end, the second end of primary winding being connected to said first pole of the coupling for providing the input voltage;
   a secondary winding having a first end and an opposite second end, the second end of the secondary winding being connected to said first pole of the coupling for providing the input voltage;
   a pulse generator with a first output that provides primary control pulses and a second output that provides secondary control pulses;

a first primary switch controllable to an ON state and an OFF state, the first primary switch having a first terminal connected to the first end of the primary winding and an second terminal connected to said second pole of the coupling for providing the input voltage, the first primary switch being controlled with the primary control pulses to set the first primary switch into an ON state that connects the primary winding of the ferromagnetic core to current pulses from the input power to energize the primary winding of the ferromagnetic core to increase a primary current through the primary winding of the ferromagnetic core to create a growing magnetic flux in the ferromagnetic core and thereby increase a secondary current in the secondary winding of the ferromagnetic core;

a secondary switch controllable to an ON state and an OFF state, the secondary switch having a control input connected to the second output of the pulse generator to receive the secondary control pulses, a first terminal of the secondary switch being connected to the first end of the secondary winding, and a second terminal of the second controllable switch being connected to said second pole of the coupling for providing the input voltage, wherein, after production of the primary control pulses when the primary winding of the ferromagnetic core is releasing magnetic energy, the secondary switch is controlled with the secondary control pulses to set the secondary switch into the ON state that connects the secondary winding of the ferromagnetic core to the input power to energize the secondary winding to change the secondary current through the secondary winding of the ferromagnetic core in order to change also the primary current, so that the ferromagnetic core with the primary and secondary windings work as a transformer, and switching the secondary switch into the ON state, connects a voltage difference of the power source via said first and second poles to the first and second ends of the secondary winding in the direction of the secondary current, which then accelerates a decrease of the magnetic flux in the ferromagnetic core, which induces a higher voltage to the primary winding until the current reduction of both the primary current and secondary current decreases to zero or close to zero, and the primary winding feeds current or energy to a load C; and a second primary switch having an input connected to the primary winding of the ferromagnetic core and an output connected to the load C, wherein the magnetic flux in the core F, produced by the primary winding of the ferromagnetic core, is greater at a location of the primary winding and smaller at a location of the secondary winding, thus causing an inequality of the flux in the ferromagnetic core.

2. The switched mode converter according to claim 1, wherein, in a first phase the first primary switch couples the primary winding of the ferromagnetic core to the input power (P) and in a second phase, the secondary switch couples the secondary winding of the ferromagnetic core to the input power to thereby convert electrical power in two phases, the first primary switch is set to the OFF state when the primary control pulses are set to an OFF state, a second primary switch coupled to connect the primary winding to the load the secondary switch is set to the OFF state when the secondary control pulses are set to an off state, and the secondary switch is set to the ON state when the first primary switch is set to the OFF state.

3. The switched mode converter according to claim 1, further comprising a counter voltage circuit connected to the secondary winding of the ferromagnetic core, the counter voltage circuit comprising at least one of an inductance and a capacitor, the counter voltage circuit producing a counter voltage in relation to the secondary current.

4. The switched mode converter according to claim 1, wherein an inductance of the secondary winding of the ferromagnetic core is greater than an inductance of the primary winding of the ferromagnetic core.

5. The switched mode converter according to claim 2, wherein the secondary winding is coupled so that in the second phase, the secondary winding is in the state of being not energized by the current pulses from the input power, the secondary winding having a self-inductance Ls, and is arranged to generate a voltage that is proportional to the secondary current change ($Us=Ls \times dIs/dt$) in the direction of the secondary current.

6. The switched mode converter according to claim 1, wherein a self-inductance of a coil of the secondary winding is greater than a self-inductance of a coil of the primary winding of the ferromagnetic core.

7. The switched mode converter according to claim 1, further comprising:

a third primary switch having an input connected to the secondary winding of the ferromagnetic core and an output connected to the load, wherein the secondary winding of the ferromagnetic core is continuously connected by the third primary switch to the load so that during a decrease phase of the primary current and the secondary current both the primary current and the secondary current release energy to the load respectively through the second primary switch and the third primary switch.

8. The switched mode according to claim 1, further comprising:

a voltage source connected to the secondary winding of the ferromagnetic core, the voltage source comprising at least one of an inductance, a capacitor, a battery, and an external DC power supply.

9. The switched mode converter according to claim 6, wherein a distance between an inner diameter of the secondary winding of the ferromagnetic core and an outer diameter of the ferromagnetic core is greater than a distance between an inner diameter of the primary winding of the ferromagnetic core and the outer diameter of the ferromagnetic core.

10. The switched mode converter according to claim 4, further comprising an inductor in series with the secondary winding of the ferromagnetic core, said inductor being separate from said ferromagnetic core.

11. The switched mode converter according to claim 1, wherein the ferromagnetic core has a closed shape, comprising a toroid or a polygon.

12. The switched mode converter according to claim 11, wherein the primary winding of the ferromagnetic core and the secondary winding of the ferromagnetic core are located at opposite sides of the ferromagnetic core.

13. The switched mode converter according to claim 1, wherein windings of said primary winding of the ferromagnetic core and windings of the secondary winding of the ferromagnetic core are arranged so that the primary current and the secondary current flow in opposite current directions.

14. The switched mode converter according to claim 2, wherein the windings of said primary winding of the ferromagnetic core and windings of the secondary winding of the ferromagnetic core provide a magnetic flux at a location of the secondary winding of the ferromagnetic core that induces a counter voltage in the secondary winding of the ferromagnetic core during the second phase, thereby consuming less input power by the secondary winding of the ferromagnetic core in the second phase during reduction of the primary current and the secondary current.

15. A method of converting electrical power, the method comprises:
   coupling a switched mode converter to a power source providing an input voltage and a corresponding input power, the power source having a first pole and a second pole, wherein said switched mode converter for converting electrical power comprises:
   a ferromagnetic core with a primary winding having a first end and an opposite second end, the second end of primary winding being connected to said first pole of the coupling for providing the input voltage;
   a secondary winding having a first end and an opposite second end, the second end of the secondary winding being connected to said first pole of the coupling for providing the input voltage;
   a pulse generator with a first output that provides primary control pulses and a second output that provides secondary control pulses;
   a first primary switch controllable to an ON state and an OFF state, the first primary switch having a first terminal connected to the first end of the primary winding and a second terminal connected to said second pole of the coupling for providing the input voltage, the first primary switch being controlled with the primary control pulses to set the first primary switch into an ON state that connects the primary winding of the ferromagnetic core to current pulses from the input power to energize the primary winding of the ferromagnetic core to increase a primary current through the primary winding of the ferromagnetic core to create a growing magnetic flux in the ferromagnetic core and thereby increase a secondary current in the secondary winding of the ferromagnetic core;
   a secondary switch controllable to an ON state and an OFF state, the secondary switch having a control input connected to the second output of the pulse generator to receive the secondary control pulses, a first terminal of the secondary switch being connected to the first end of the secondary winding, and a second terminal of the second controllable switch being connected to said second pole of the coupling for providing the input voltage,
   wherein, after production of the primary control pulses when the primary winding of the ferromagnetic core is releasing magnetic energy, the secondary switch is controlled with the secondary control pulses to set the secondary switch into the ON state that connects the secondary winding of the ferromagnetic core to the input power to energize the secondary winding to change the secondary current through the secondary winding of the ferromagnetic core in order to change also the primary current, so that the ferromagnetic core with the primary and secondary windings work as a transformer, and switching the secondary switch into the ON state, connects a voltage difference of the power source via said first and second poles to the first and second ends of the secondary winding in the direction of the secondary current, which then accelerates a decrease of the magnetic flux in the ferromagnetic core, which induces a higher voltage to the primary winding until the current reduction of both the primary current and secondary current (I2) decreases to zero or close to zero, and the primary winding feeds an increase current or energy to a load C; and
   a second primary switch having an input connected to the primary winding of the ferromagnetic core and an output connected to the load C,
   wherein the magnetic flux in the core F, produced by the primary winding of the ferromagnetic core, is greater at a location of the primary winding and smaller at a location of the secondary winding, thus causing an inequality of the flux in the ferromagnetic core,
   in a first phase, controlling the first primary switch with the primary control pulses to energize the primary winding to increase the primary current to create the magnetic flux in the ferromagnetic core,
   switching, by said primary control pulses, the first primary switch into the ON state to connect the primary winding to input power to provide a primary pulse of input power to the primary winding during each said primary control pulse,
   in a second phase and directly after ending the primary control pulses, energizing the secondary winding using secondary pulses of input power via the second primary switch being in the ON state during said secondary pulses of input power, and
   directing by setting said first primary switch into the OFF state, the primary winding to release magnetic energy of the magnetic flux to the load between the ON states of the first primary switch providing the primary pulses of input power, whereby the primary current of the primary winding decreases during the OFF state of the first primary switch.

* * * * *